J. A. MANNING.
Vehicle-Axle Box and Journal.
No. 217,698. Patented July 22, 1879.
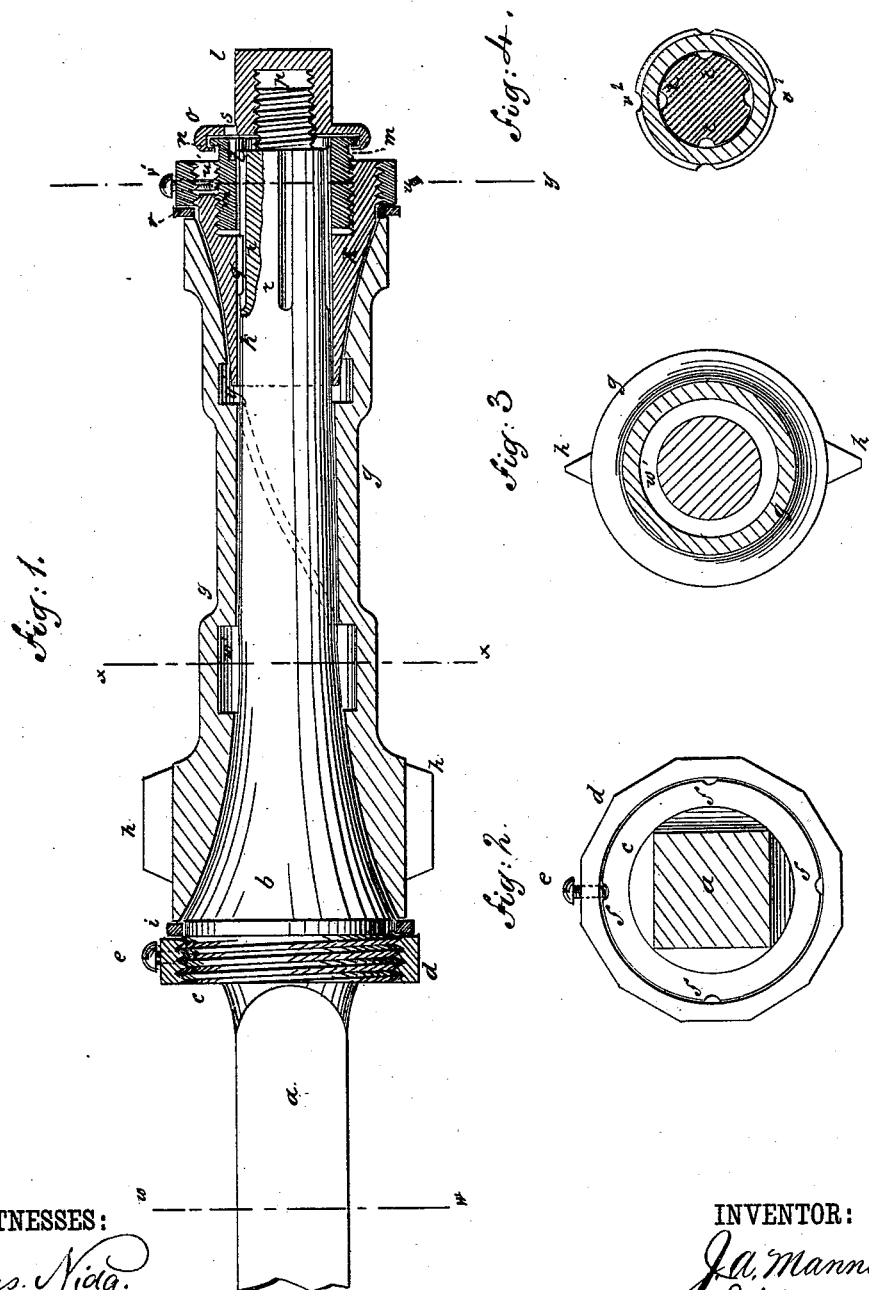

UNITED STATES PATENT OFFICE.

JAMES A. MANNING, OF DANVILLE, INDIANA.

IMPROVEMENT IN VEHICLE AXLE BOXES AND JOURNALS.

Specification forming part of Letters Patent No. 217,698, dated July 22, 1879; application filed December 3, 1878.

*To all whom it may concern:*

Be it known that I, JAMES A. MANNING, of Danville, in the county of Hendricks and State of Indiana, have invented a new and Improved Axle-Box and Journal, of which the following is a specification.

My invention relates to an improved form of axle-box and journal for vehicles, whereby rattling is prevented, the box may be adjusted to compensate for wear, the journal will retain the oil or grease, and the box is prevented from wedging upon the journal.

The invention will first be described in connection with the drawings, and then pointed out in the claims.

In the accompanying drawings, Figure 1 is a longitudinal section of my improved axle-box and journal. Fig. 2 is a cross-section at the line $w\,w$. Fig. 3 is a cross-section at the line $x\,x$; and Fig. 4 is a cross-section of the journal at the line $y\,y$.

Similar letters of reference indicate corresponding parts.

$a$ represents one end of a carriage or other axle. The inner end of the journal is formed with a tapering or conical enlargement, $b$. The larger part of said cone, next to the axle $a$, is formed as a flange or collar, $c$, and is threaded to receive a screw-collar, $d$, that may be adjusted upon the flange $c$, and is held from turning by a screw-pin, $e$, that passes from the outside of the collar $d$ into any one of the notches $f$ of the flange $c$. (See Fig. 2.)

$g$ is the metal box, that is held in the hub (not shown) by radial lugs $h$. The inner end of the box $g$ is formed to set snugly upon the conical enlargement $b$ of the journal. I prefer to form the surface of the cone $b$ slightly concave, as shown, and the box $g$ convex to correspond, which formation acts to prevent the box wedging upon the journal. The end of box $g$ sets against a leather-washer, $i$, that is between the box and the screw-collar $d$. Wear is compensated for by setting up the collar $d$, as before described; and the collar $d$ also prevents the box $g$ from jamming upon the journal. The outer end of the box $g$ is made flaring to fit upon a conical sleeve, $k$, that is held upon the outer end of the journal by a nut, $l$, as hereinafter described. The surface of sleeve $k$ is concave and the box convex to correspond, for the same purpose as mentioned in connection with the cone $b$.

The conical sleeve $k$ is connected at its outer and large end to a collar, $m$, the connection being made by an exterior thread on the collar $m$ and an interior thread in the sleeve $k$. The projecting edge of the collar $m$ has a flange, $n$, and the nut $l$ a rim or flange, $o$, that is turned over the flange $n$ of the collar, whereby the nut and flange are connected; but the nut $l$ may turn independent of the sleeve $k$ and collar $m$.

The nut $l$ screws upon the thread $p$, that is formed on the outer end of the journal, as usual. The sleeve $k$ is prevented from turning by a short rib, $q$, projecting at the inside of the sleeve, which enters either one of the longitudinal grooves $r$ cut in the surface of the journal. (See Fig. 1.) The sleeve $k$ may be adjusted lengthwise by turning the collar $m$. To facilitate the said adjustment I provide a hole, $s$, in flange $o$ of nut $l$, and form a groove, $t$, inside the collar $m$, so that by inserting a nail or similar instrument through the hole $s$ into groove $t$ the collar $m$ may be turned.

The surface of the sleeve $k$, at its larger end, is screw-threaded to receive a screw-collar, $u$, that is similar to the collar $d$ at the inner end of the journal, and answers a similar purpose. $v$ is a washer between the collar $u$ and end of box $g$. The collar is kept from turning upon the sleeve by a screw-pin, $v^1$, that passes through the collar $u$, through a slot, $u'$, in sleeve $k$, and into a groove, $v^2$, in surface of collar $m$. The screw-pin $v^1$ therefore prevents movement upon each other of the collar $m$, sleeve $k$, and collar $u$. The said pin $v^1$ is to be removed when the parts are to be adjusted.

$w'$ and $y'$ are recesses formed at the inside of box $g$ to serve as grease-receptacles. They may be connected by a spiral groove, as shown by dotted lines in Fig. 1. The recess $y'$ is contiguous to the inner end of conical sleeve $k$, and prevents the end of the sleeve from wearing or embedding itself in the box, which it might do if the recess $y'$ were not provided.

By the construction above described there can be no rattling of the box and journal, the lubricating material is retained upon the contact surfaces, and the box prevented from wedging upon the journal by the shape of the journal and the collars at each end of the box. The parts may be also readily adjusted and wear compensated for.

In applying my invention to an old spindle I make use of a conical sleeve, to take the place of the conical enlargement at the inner end of the spindle. It will be kept in place by a tongue on the inside, in the same manner as the front cone.

Having thus described my invention, what I claim as new, and desire to secure by Letters Patent, is—

1. The combination, with a journal having concave cone $h$ at one end and concave sleeve-cone $k$ at the other, of the correspondingly-constructed box $g$, the collars $d\ u\ m$, screws $e\ v^1$, and washers $i\ v$, as and for the purpose specified.

2. The combination and arrangement of the collar $m$ and nut $l$ with the sleeve $k$, substantially as and for the purpose as set forth.

JAMES A. MANNING.

Witnesses:
 WM. T. LINN,
 THOS. N. JONES.